UNITED STATES PATENT OFFICE.

ROLLA O. HEIKES, OF DAYTON, AND HARRY C. CLIPPINGER, OF AKRON, OHIO.

AERIAL TARGET.

No. 801,867. Specification of Letters Patent. Patented Oct. 17, 1905.

Application filed January 18, 1905. Serial No. 241,551.

*To all whom it may concern:*

Be it known that we, ROLLA O. HEIKES, residing at Dayton, in the county of Montgomery, and HARRY C. CLIPPINGER, residing at Akron, in the county of Summit, in the State of Ohio, citizens of the United States, have jointly invented certain new and useful Improvements in Aerial Targets; and we do declare the following to be a full, clear, and exact description of the invention, such as will enable others skilled in the art to which it appertains to make and use the same, reference being made to the accompanying drawings, and to the figures of reference marked thereon.

This invention relates to new and useful improvements in imitation birds or aerial targets for use in the sport known as "trap-shooting." This class of sport, as is well known, consists of liberating from a trap live birds which are shot at by the sportsman or clay birds which are ejected or forced from a trap into the air and are likewise shot at during their movement or flight. The use of live birds is more desirable in this class of sport, owing to the uncertain or irregular course of flight; but such use is largely interdicted owing to the expense and owing, further, to the fact that many of the States have enacted laws which prohibit the slaughter of birds for mere amusement. The clay birds as they are now commonly made consist simply of lumps of molded clay, which require much force to throw them and which have a constant tendency to gravitate to the earth, owing to the inertness thereof.

It is the object of this invention to provide a bird or aerial target for this class of sport which will very closely resemble in its movements the flight of a natural bird—in other words, to provide an imitative bird which will when ejected or thrown out into space float in a manner similar to the movements of a natural bird and will change the course of flight or movement in a manner similar to a live bird and owing to its being constructed, essentially, of fragile or breakable material will shatter when struck by shot.

Preceding a detail description of the invention, reference is made to the accompanying drawings, of which—

Figure 1:
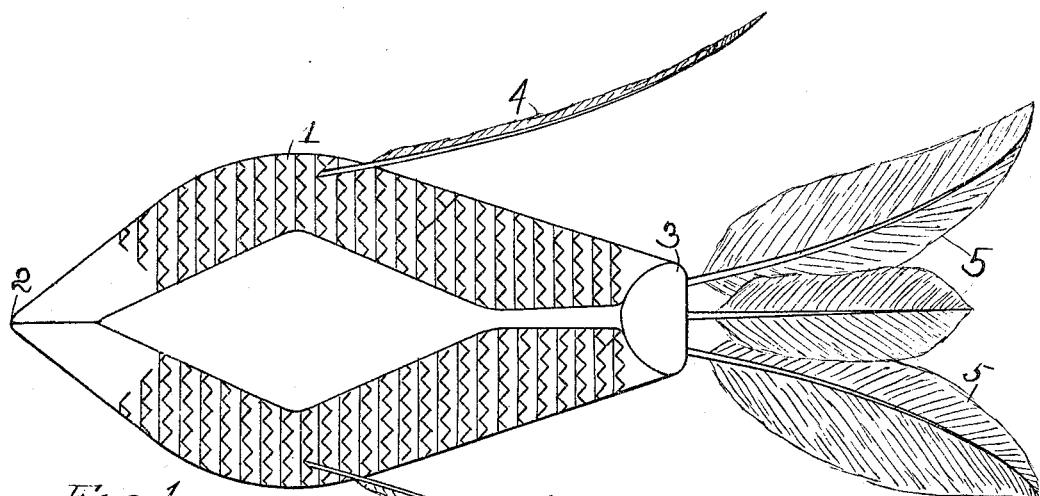
Figure 2:
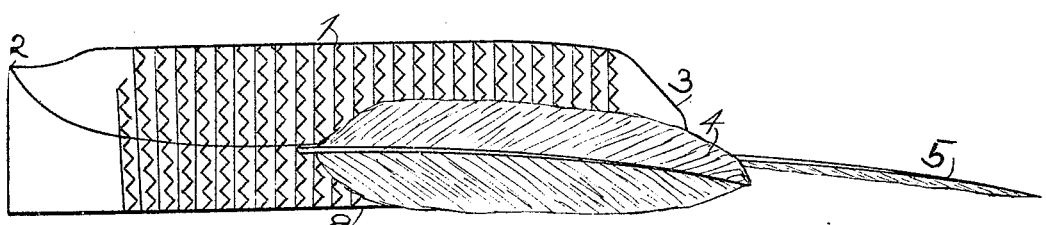
Figure 3:
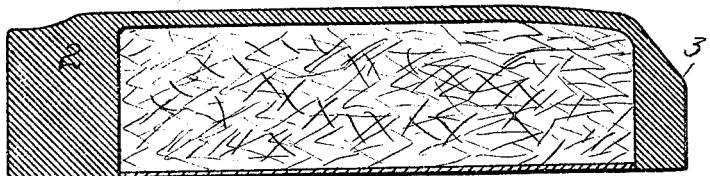
Figure 4:
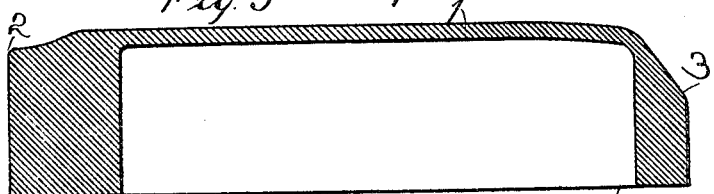

Figure 1 is a top plan view of a bird or aerial target constructed in accordance with our invention. Fig. 2 is a side elevation thereof. Fig. 3 is a longitudinal midsectional elevation with the tail and wing sails or feathers removed, showing the interior of the body closed. Fig. 4 is a similar view showing the interior of the body open.

In a detail description of the invention similar reference characters indicate corresponding parts.

The body of the bird or aerial target 1 is of a boat shape having parallel lines on top and bottom, its forward end 2 converging to a point and its rearward end 3 of a rounded top and flat bottom. The top thereof or the upper surface is flat and is corrugated, indented, or roughened throughout the sides and upper surface in order that the impacting shot will not glance off, but will break or shatter the structure. This body is essentially constructed of fragile or breakable material—such, for example, as composition, clay, plaster-of-paris, glass, or any other material which is fragile in its nature. The body essentially has a slight excess of weight at its forward end from a median transverse line to imitate or duplicate as near as possible nature's work in the formation of the body of a live bird. The body is essentially hollow to provide a requisite specific lightness, and attached thereto at opposite points are wing-feathers or sails 4 4, and a suitable number of tail-feathers or sails 5 are attached to the rear end of the said body, there being suitable space left at said rear end for the impact or contact of an ejector or plunger which is used to force the target into the air. This ejector or plunger is not shown in the drawings; but it may be stated that the object of the same is to apply the necessary force to the bird or aerial target to throw it into the air. The trap containing said ejector or plunger will be made the subject-matter of a separate application for Letters Patent, and no further reference thereto is thought to be necessary.

The interior of the body, as shown in Fig. 3, is supplied with a filling consisting of a quantity of loose feathers or other similar material, which is maintained therein by an attachable flat bottom 7, which is constructed of light material—such, for example, as cardboard or the like—and is sprung between the lower edges of said body or is secured in any suitable manner. When the body is broken by the impact of shot, these feathers will be liberated and scatter to a greater or less extent in the air and will thus resemble very much the appearance of a live bird when struck by a shot. The bottom 8 is flat, as before stated, and by reason of such construction and the wing and tail feathers or sails the bird or aerial target is controlled by the air and is given much the appearance of a live bird.

The filling or feathers may or may not be employed on the interior of the body. Fig. 4 shows said body free from interior filling; but it will be readily seen that by placing within said body the feathers referred to the bird or aerial target when broken will have an increased resemblance to a live bird. We therefore do not wish to limit ourselves in this respect, our object being to provide an aerial target that will be controlled by the air in its flight as near as possible to the movements of a live bird.

Having described our invention, we claim—

1. An imitative bird or aerial target for trap-shooting, consisting of an oblong hollow body of fragile material having its lower side uninclosed and its upper surface flat, the forward end thereof terminating in converging angles, the said body having an excess of weight at its forward end, and means attached to the body for enabling the air to maintain it in its aerial flight.

2. An imitative bird or aerial target for trap-shooting, consisting of an oblong hollow body of fragile material, the top of said body being of flat form, and the forward end terminating in converging angles, with feathers or sails attached to the sides and rear end of said body for controlling it in the air and directing an irregular flight thereof when forcibly ejected into the air.

3. As a new article of manufacture, an imitative bird or aerial target for trap-shooting, having as essential characteristics, an elongated hollow body of fragile material, the forward end of said body terminating in converging lines, and the rear end terminating in a flat surface extending down at a right angle from the upper surface of said body, the interior of said body containing a loose filling so that when said body is shattered while in the air, the effect will resemble a live bird when wounded by a shot from a fowling-piece, and means attached to the sides and rear end of said body enabling it to be maintained in the air in an irregular course of movement.

In testimony whereof we hereunto affix our signatures in the presence of two witnesses.

ROLLA O. HEIKES.
HARRY C. CLIPPINGER.

Witnesses:
R. J. McCarty,
John W. McKeown.